Patented July 19, 1938

2,124,419

UNITED STATES PATENT OFFICE 2,124,419

PROCESS OF PRODUCING PHTHALOCYANINE COMPOUNDS

Isidor Morris Heilbron, Manchester, England, Francis Irving, Grangemouth, Scotland, and Reginald Patrick Linstead, London, England, assignors to Imperial Chemical Industries Limited, a corporation of Great Britain No Drawing. Application May 14, 1936, Serial No. 79,815. In Great Britain November 16, 1932

5 Claims. (Cl. 260—11)

This application relates to the manufacture of coloring matters of the phthalocyanine series, and constitutes a continuation-in-part of our copending application, Serial No. 698,216, filed November 15, 1933.

It is an object of this invention to provide an improved process for the manufacture of coloring matters of the phthalocyanine series, especially those containing combined metal of the group consisting of iron, nickel, and cobalt. Other and further important objects of this invention will appear as the description proceeds.

In British Patent Specification No. 322,169 there is described a process for the production of blue to green coloring matters by heating phthalic anhydride with ammonia and certain metals or metal compounds including iron, cuprous chloride and nickel sulphide. In British Patent Specification No. 389,842, (corresponding to U. S. Patent No. 2,000,051) there is described a process for the production of nitrogen-containing coloring matters of complex constitution which comprises heating an o-cyanoarylcarboxyamide in the presence of specified metals and metal compounds, among them iron, nickel, cobalt and their oxides or sulfides. These coloring matters are described as purple to green in color and stated to appear to belong to one general class, this class appearing to include the said coloring matters of British Patent Specification No. 322,169.

We have now found that coloring matters of the same general series containing in chemical combination a metal of the magnetic series, namely iron, nickel or cobalt, may be obtained more readily and efficiently by heating the corresponding metal or a compound thereof with an o-arylene-dicyanide, such as phthalonitrile.

The heating may be effected immediately between the o-arylene-dicyanide and the metal or metal compound, such as the chloride, oxide or sulphide, or it may be carried out in the presence of a suitable solvent or diluent. A high boiling inert organic solvent, such as naphthalene, methylnaphthalene or chloronaphthalene, is particularly suitable for this purpose. Tertiary bases such as quinoline, pyridine or dimethylaniline may also be employed.

The temperature of the reaction will depend on the boiling point or fusing point of the mixture employed or on the constituents of the mixture and it will generally be within the range of 150° to 400° C.

The reaction is applicable to substituted phthalonitriles, such as methyl-, halogen- or nitro-phthalonitriles, as well as to the o-dinitriles of naphthalene and anthracene.

The so-obtained coloring matters are typically blue to green in shade, have only slight solubility in organic solvents, but dissolve in concentrated sulfuric acid and are decomposed by nitric acid. They contain nitrogen, are of complex constitution and contain the respective metal in combined form. The preferred ratio of reactants is about 4 moles of the o-arylene-dicyanide to from 1 to 2 moles of the metal of its compound. After the reaction, the excess metal compound may be removed by extraction with water, if it is water-soluble, or by precipitating the pigment from concentrated sulfuric acid. The coloring matters may also be purified by crystallization from a suitable solvent, e. g. quinoline or chloronaphthalene, or by sublimation.

Working according to this new process the coloring matters are, generally speaking, formed with greater readiness than according to those of the above-mentioned specifications and higher yields, in some cases nearly the theoretical, are obtained. Purification may be effected as already described in the said specification.

The coloring matters may be employed as pigments. For instance they may be made into lakes with the usual substrata. Such lakes may be used as coloring matters for varnishes and inks.

The following examples in which parts are by weight illustrate but do not limit the invention.

Example 1

6.5 parts of phthalonitrile and 2 parts of anhydrous nickelous chloride are heated without a solvent at 230° to 240° C. for two and one-half hours. The melt is cooled and extracted successively with acetone and water, and dried. The product obtained is a bronze-blue-crystalline powder which, upon grinding, turns to a dark-greenish blue. The compound appears to contain nickel in combined form.

Example 2

6 parts of phthalonitrile and 3.4 parts of finely powdered nickel oxide are heated together with stirring at 280° C. for 4 hours. The reaction mass is cooled, ground, extracted with boiling acetone, and with boiling 7% hydrochloric acid, washed with water and dried. It is purified by crystallizing from technical chloronaphthalene, or by subliming or by dissolving in sulphuric acid and precipitating with water. The sublimation purification yields needles with an extremely bright red lustre.

*Example 3*

6.5 parts of phthalonitrile and 2 parts of cobaltous chloride are heated at a temperature of 230 to 240° C. for half an hour. The melt is cooled and extracted successively with acetone and water. Upon drying, a bronze colored crystalline powder is obtained which turns, upon grinding, to a dark-greenish blue. It contains cobalt in chemical combination.

*Example 4*

10.2 parts of pthalonitrile and 2.6 parts of anhydrous cobaltous chloride are intimately mixed and heated to 200° C. with stirring. The coloring matter is formed at once, the temperature rises and hydrogen chloride is evolved. The reaction mass is cooled, ground and extracted with boiling alcohol, with boiling water and dried. The dry coloring matter is blue and when crystallized from boiling technical chloronaphthalene it yields long blue needles with a purple lustre of empirical formula corresponding to $(C_6H_4C_2N_2)_3(C_6H_3C_2N_2Cl)Co$. When crystallized from pyridine, the crystals contain pyridine of crystallization.

*Example 5*

10 parts of phthalonitrile are boiled for 4 hours with 3 parts of cobalt (which has been etched immediately before use by warming with dilute hydrochloric acid, washing and drying). The reaction mass is cooled, and the excess metal is removed by mechanical means. The residue is ground and extracted with boiling alcohol and dried. The coloring matter is very soluble in boiling quinoline and technical chloronaphthalene. It can also be sublimed and then yields blue needles with a reddish-purple lustre. It dissolves in concentrated sulphuric acid with a green color and from the solution water precipitates the coloring matter without removing the combined nickel. It has the empirical formula $C_{32}H_{16}N_8Co$.

*Example 6*

20 parts of phthalonitrile are intimately mixed with 10 parts of anhydrous ferric chloride and heated with stirring to 210° C. The mass solidifies at this temperature and the heating is continued for a further half an hour. The reaction mass is cooled, ground and extracted with boiling alcohol. The coloring matter is dark green and appears to be a mixture of ferrous chlorophthalocyanine $(C_{32}H_{15}Cl\,N_8)Fe$ and chloroferric chlorophthalocyanine $(C_{32}H_{15}ClN_8)FeCl$.

*Example 7*

A mixture of 16.25 parts of 4-chlorophthalonitrile, 3.25 parts of anhydrous nickelous chloride and 5 parts of technical chloronaphthalene is heated with stirring at about 230–240° C. for 4 hours. The reaction mass is cooled, ground and extracted successively with boiling xylene, hot alcohol and water. It is purified by dissolving in 10 times its weight of concentrated sulphuric acid, and pouring the solution into water, filtering, washing and drying. It is greenish-blue in color and contains combined metal.

*Example 8*

This is similar to Example 7 except that the 4-chlorophthalonitrile is replaced by 19.7 parts of 4,5-dichlorophthalonitrile. A greenish-blue coloring matter containing combined metal similar to that of Example 7 is obtained.

*Example 9*

A mixture of 4 parts of anhydrous nickelous chloride and 6 parts of 4,5-dichlorophthalonitrile is heated at 240–250° C. with stirring for 4 hours. The reaction mass is cooled, extracted with boiling acetone, then with 7% hydrochloric acid, washed with water and dried. A greenish-blue coloring matter containing combined metal similar to that of Example 7 is obtained.

In a similar manner, coloring matter may be prepared from substituted phthalonitriles such as 3- or 4-chloro-phthalonitrile and 4.5-dichloro-phthalonitrile and 3- or 4-nitro-phthalonitrile or methyl phthalonitriles.

It will be understood that the details of procedure given above, for instance as to solvent employed, temperature and duration of the reaction, method of extraction and purification, etc., may be interchanged between the various examples, and may be varied further within wide limits, without departing from the spirit of this invention.

We claim:

1. The process of producing coloring matters of the phthalocyanine series which comprises subjecting an o-arylenedicyanide to the action of heat in the presence of a substance capable of yielding a magnetic metal.

2. The process of producing coloring matters of the phthalocyanine series which comprises heating an o-arylene-dicyanide at a temperature between 150° to 400° C. in the presence of a substance capable of yielding a metal of the group consisting of iron, nickel and cobalt.

3. The process of producing coloring matters of the phthalocyanine series which comprises heating an o-arylenedicyanide in a solvent which is liquid under the given conditions, in the presence of a member of the group consisting of iron, nickel, cobalt and their compounds which are capable of yielding the respective metals in chemical reactions.

4. The process of producing coloring matters of the phthalocyanine series which comprises heating phthalonitrile and nickelous chloride at a temperature of about 230° to about 240° C. and recovering the pigment thus produced.

5. The process of producing coloring matters of the phthalocyanine series which comprises heating phthalonitrile and cobaltous chloride at a temperature of about 230° to about 240° C. and recovering the pigment thus produced.

ISIDOR MORRIS HEILBRON.
FRANCIS IRVING.
REGINALD PATRICK LINSTEAD.